United States Patent [19]
Sanftleben et al.

[11] Patent Number: 5,608,028
[45] Date of Patent: Mar. 4, 1997

[54] POLYBUTADIENE URETHANE POTTING MATERIAL

[75] Inventors: Henry M. Sanftleben, Carmel, Ind.; Ralph D. Hermansen, North Ridge, Calif.

[73] Assignees: Delco Electronics Corp., Kokomo, Ind.; Hughes Aircraft, Los Angeles, Calif.

[21] Appl. No.: 189,984

[22] Filed: Feb. 2, 1994

[51] Int. Cl.$^6$ .............................. C08G 4/00; C08G 59/00
[52] U.S. Cl. .................. 528/60; 528/66; 528/73; 528/75; 528/905
[58] Field of Search .................. 528/73, 75, 60, 528/66, 905; 521/3

[56] References Cited

U.S. PATENT DOCUMENTS

| | | | |
|---|---|---|---|
| 3,891,456 | 6/1975 | Hohman et al. | 134/3 |
| 4,210,704 | 7/1980 | Chandross et al. | 428/414 |
| 4,871,477 | 10/1989 | Dimanshteyn | 252/609 |
| 5,079,270 | 1/1992 | Burkhart et al. | 521/117 |
| 5,079,275 | 1/1992 | Duruasula et al. | 521/163 |
| 5,185,498 | 2/1993 | Sanftleben et al. | 174/52.2 |

FOREIGN PATENT DOCUMENTS 2168855  6/1986  United Kingdom .

OTHER PUBLICATIONS

Derwent Abstract of JP 01215817–A to Sanyo Chemical (Aug. 1989).
Derwent Abstract of J63130617A to Toshiba KK (Nov. 1986).
Derwent Abstract of J56115308 to Hitachi Chemical (Sep. 1981).
Industrial Chemical Thesaurus, V2, editor Ash et al. VCH Publishers Inc. p. 52 1992 (month unavailable).
Grant and Hackh's Chemical Dictionary, p. 115 McGraw–Hill Inc 1987 (month unavailable).

*Primary Examiner*—Jeffrey C. Mullis
*Attorney, Agent, or Firm*—Jimmy L. Funke

[57] ABSTRACT

An adhesive material is provided which is particularly suitable for potting a sensing element within a container. The adhesive material is characterized by mechanical and physical properties which enable the adhesive material to maintain its adhesive and structural integrity under intense thermal cycling conditions, so as to exclude foreign elements from the sensing element when potted within a container with the potting material. The adhesive material can be formulated so as to be sufficiently adherent for use with containers formed from materials such as polybutylene terephthalate, polyethylene terephthalate, and E-coated steel, by including additions of a flexibilized polyol/polyepoxide epoxy novolac in an amount of up to about 15 parts by weight.

20 Claims, 1 Drawing Sheet

POLYBUTADIENE URETHANE POTTING MATERIAL

The present invention generally relates to adhesive materials, such as potting and encapsulation materials which are suitable for protecting electrical components or circuits from the environment. More particularly, this invention relates to an adhesive urethane material which is particularly suitable for potting an acceleration sensor assembly, in which the adhesive material enables the assembly to survive intense thermal cycling in an automotive environment. The invention involves the use of an epoxy hydroxyl addition which can be used to promote adhesion in any urethane system.

BACKGROUND OF THE INVENTION

Supplementary inflatable restraints (air bags) in automobiles typically utilize an acceleration sensor element located in the engine compartment. If the sensor element is of the mechanical accelerometer type, it is mounted in an open container along with a printed circuit board and other components, all of which are surrounded by a potting material which protects the sensor element and other components from the hostile environment of the engine compartment. As such, the sensor assembly is subjected to extreme thermally-induced stresses resulting from thermal cycling and thermal shock. In addition, unless the sealing integrity of the potting material is continuously maintained, the sensor assembly is also subject to water, salt and other chemicals which could have a deleterious effect on the sensor's performance. Thus the reliability of the sensor element depends on the ability of the potting material to prevent the intrusion of harmful substances.

While the above considerations are generally true of any electrical assembly exposed to such a harsh environment, an additional requirement of the potting materials used to encapsulate an acceleration sensor element is that the material must faithfully and reliably transmit the acceleration of the vehicle-mounted container to the sensor element within the container. Conventionally, a potting material which is able to fully transmit the acceleration of its container to the sensor element is said to have a transfer function of one with respect to acceleration.

A known potting material for acceleration sensor elements is composed of methylene di-p-phenylene isocyanate (MDI) and castor oil based urethane, and is implemented using "pot-on-sand" (POS) processing techniques. Such techniques involve pouring a mixed urethane over hot sand contained in the sensor container, or by vibrating hot sand into the urethane in the sensor container. Once cured, the potting material provides environmental protection for the sensor element. However, such potting materials have a number of disadvantages. Notably, they are extremely difficult to process, and any processing error may result in an assembly having diminished reliability. Even if correctly processed, the sensor assemblies at times do not pass rigorous environmental testing for water intrusion into the sensing element following salt spray or thermal cycling tests. In addition, a conformal coating over the printed circuit board is typically required to protect the board from the sand in the potting material, resulting in added processing steps and costs. Finally, because vibration is required to evenly distribute the sand in the urethane, some fixturing, adhesive or otherwise, must be used to hold the sensor element in place, which adds additional costs to the manufacture of the acceleration sensor assembly.

As a solution, U.S. Pat. No. 5,185,498 to Sanftleben et al. teaches a potting compound which is formulated to meet or exceed the mechanical, physical and material requirements for use in a potted acceleration sensor assembly used in an automotive environment, yet avoids the processing shortcomings noted above for prior art potting materials. Specifically, Sanftleben et al. teach a potting compound composed of polybutadiene urethane having physical and mechanical properties which enable the potting compound to maintain its sealing integrity under intense thermal cycling conditions to exclude foreign elements from the sensor element. Though the polybutadiene urethane potting compound taught by Sanftleben et al. is a rubbery elastomeric material, it is unexpectedly capable of faithfully transmitting acceleration from its container to the sensor element, so as to have a transfer function of nearly one with respect to acceleration.

Furthermore, Sanftleben et al. teach that additions of a novolac epoxy resin to the potting compound of up to about 10 weight percent enhances the ability of the potting compound to adhere to the interior walls of the container, so as to further reduce the likelihood of water intrusion into the assembly. Sanftleben et al. disclose the use of a metal container in which the sensor assembly is potted. In general, a potting material can typically adhere to a metal or a metal coated with an electrically deposited epoxy-based paint (E-coated metal) more readily than to engineering resins, such as polybutylene terephthalate (PBT) and polyethylene terephthalate (PET). Consequently, it would be desirable if further improvements in the adhesion properties of the potting compound taught by Sanftleben et al. could be achieved in order to promote the reliability of the sensor element when housed within a container formed from such engineering resins. Furthermore, it would also be desirable if the adhesion characteristics of the potting compound were sufficient so as to enable the potting compound to be used as an adhesive, coating, or encapsulating material for a wide variety of applications.

SUMMARY OF THE INVENTION

It is an object of this invention to provide an adhesive compound which is suitable for potting an electronic assembly within a container for use in a hostile environment.

It is another object of this invention to provide an adhesive compound which can be processed in a manner which overcomes the shortcomings of prior art potting urethanes whose processing requires the use of pot-on-sand techniques.

It is yet another object of this invention to provide an adhesive compound whose performance in a hostile automotive environment is similar to or exceeds that of the polybutadiene urethane potting compound taught by U.S. Pat. No. 5,185,498 to Sanftleben et al.

It is a further object of this invention to provide an adhesive compound which exhibits enhanced adhesion properties so as to enable the adhesive compound to reliably adhere to the surfaces of an engineering resin, such as polybutylene terephthalate or polyethylene terephthalate.

In accordance with a preferred embodiment of this invention, these and other objects and advantages are accomplished as follows.

According to the present invention, there is provided an adhesive material which is suitable for use as a potting material for potting a sensing element within a container. As with the potting material taught by U.S. Pat. No. 5,185,498 to Sanftleben et al., the adhesive material of this invention is characterized by a glass transition temperature of below about −10° C., and mechanical properties at about 25° C. of about 15 to about 90 Shore A durometer, about 50 to about 300 percent elongation, and about 75 to about 900 psi tensile strength. The above properties enable the adhesive material to maintain its structural and sealing integrity under intense thermal cycling conditions when used to pot an electronic assembly, such as a sensing element, within a container, so as to exclude foreign elements from the sensing element. However, in order for the adhesive material to be sufficiently adherent to a container formed from engineering resin materials such as polybutylene terephthalate and polyethylene terephthalate, the adhesive material includes additions of a flexibilized polyol/polyepoxide epoxy novolac in an amount of up to about 15 weight percent, or more.

In particular, the adhesive material of this invention contains at least about 85 parts by weight polyol of which at least about 70 weight percent is a polybutadiene polyol, and the flexibilized polyol/polyepoxide epoxy novolac in an amount of up to about 15 parts by weight. A multifunctional isocyanate is added in an amount sufficient to achieve a stoichiometrically correct ratio with the polyol, though greater amounts of isocyanate can be added to ensure complete reaction with the polyol's hydroxyl groups for the purpose of achieving the desired properties for the adhesive material. In a preferred embodiment, the polyol consists essentially of about 90 weight percent polybutadiene polyol and about 10 weight percent polyoxypropylene polyol, and the flexibilized polyol/polyepoxide epoxy novolac is an epoxy novolac containing at least one hydroxyl group, at least one epoxide group, and a flexibilizing side-chain appendage to the aromatic ring consisting of fifteen carbon atoms. An example of such an epoxy resin is available from Cardolite under the trademark CARDOLITE NC-547, which is a polyglycidyl ether of an alkenyl phenol formaldehyde novolac resin having a fifteen carbon atom side-chain having the following chemical structure

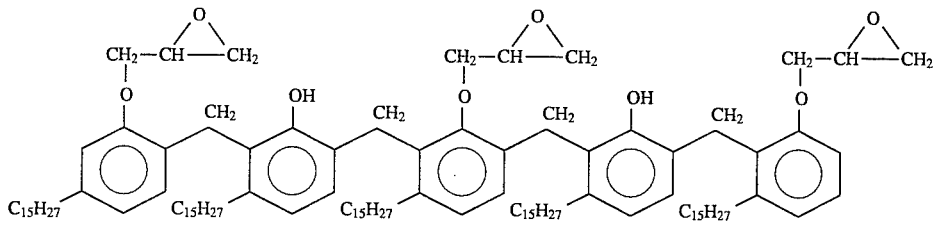

The adhesive material may further include additions of up to about three weight percent of an antioxidant, about one weight percent of a defoaming agent, and possibly additives such as a metallic catalyst, pigment, a filler material, a plasticizer or extender, and/or an adhesion promoter.

The adhesive material of this invention is particularly suitable for potting an acceleration sensing element within a container for use in an automotive environment. In that the adhesive material of this invention is characterized by having essentially the same polyol blend as the polybutadiene urethane potting compound taught by U.S. Pat. No. 5,185,498 to Sanftleben et al., the present adhesive material is readily able to withstand the hostile environment of an automobile engine compartment. Furthermore, the adhesive material of this invention also can be processed in a manner which overcomes the shortcomings of prior art potting urethanes whose processing requires the use of pot-on-sand techniques. However, with additions of the flexibilized polyol/polyepoxide epoxy novolac in excess of that taught by Sanftleben et al., the adhesive material is able to exhibit enhanced adhesion properties so as to enable the adhesive material to reliably adhere to the surfaces of a container formed from an engineering resin, such as polybutylene terephthalate or polyethylene terephthalate, as well as containers formed from such materials as E-coated steels. In addition, the adhesive material of this invention could also be used as an adhesive, coating, or an encapsulating material for a wide variety of applications.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings wherein.

DETAILED DESCRIPTION OF THE INVENTION

While the following description of this invention will be made with-reference to an acceleration sensor assembly 10 shown in FIGS. 1 and 2, it is entirely foreseeable that the teachings of this invention are applicable to other potted sensor or circuit assemblies of the type used in the automotive industry, as well as applications within other industries.

Figure 1:
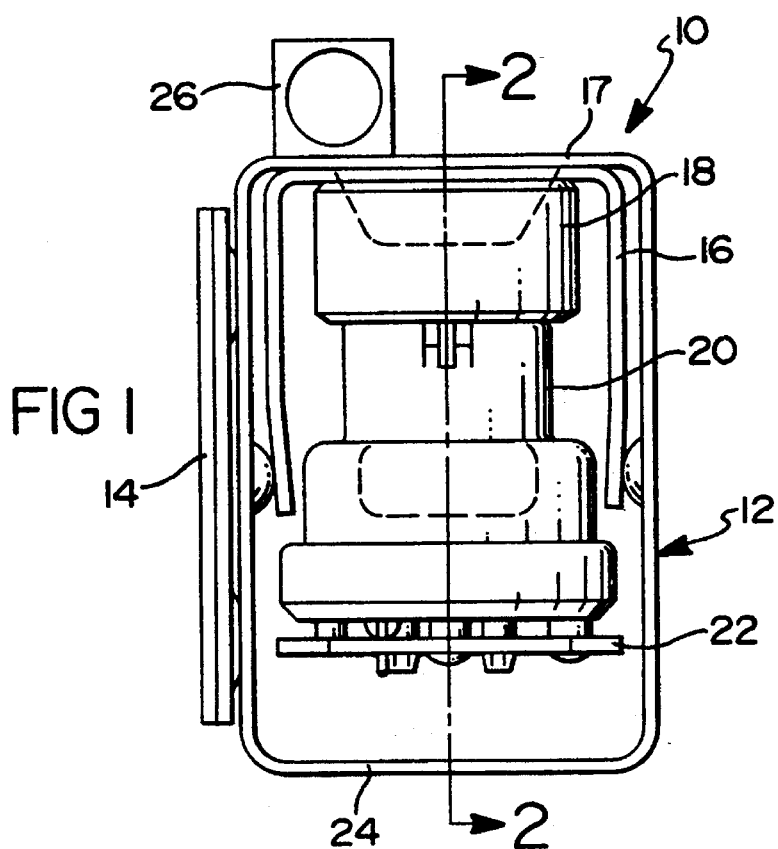
FIG. 1 is a plan view of an acceleration sensor assembly without the adhesive potting material of this invention.
Figure 2:
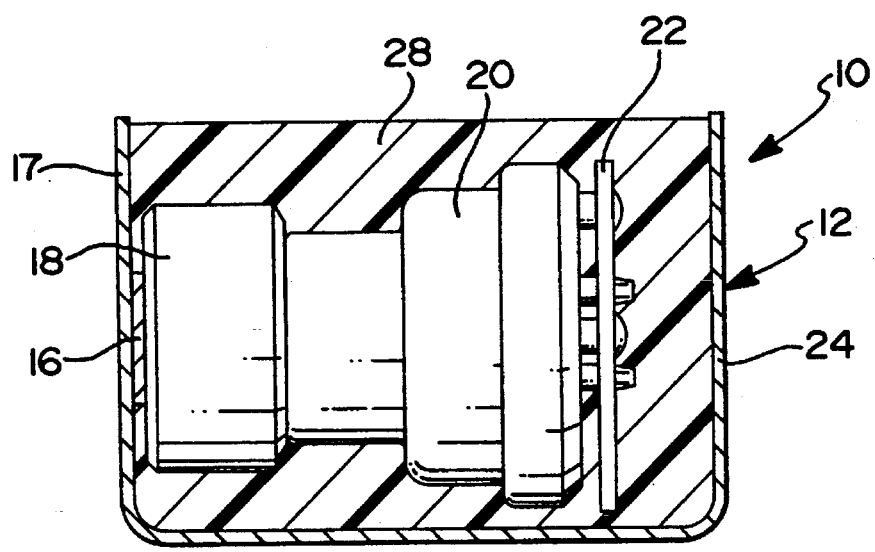
FIG. 2 is a cross-sectional view of the acceleration sensor assembly along line 2—2 of FIG. 1, in which the sensor is shown as having been potted with the adhesive potting material of this invention.

As illustrated, the acceleration sensor assembly 10 shown in FIGS. 1 and 2 generally includes an open can 12, an external mounting bracket 14 for mounting the can 12 to a suitable surface, a U-shaped keeper 16, a ceramic magnet 18 located in the bight of the keeper 16, and a sensor housing 20 which supports a printed circuit board 22. The can 12 may be formed from any suitable structural material, such as a metal, though other materials such as engineering resins and E-coated steels may also be used. As a particular advantage of this invention, the can 12 can be formed from engineering resins having a glass-like surface finish, such as polybutylene terephthalate (PBT) and polyethylene terephthalate (PET), as will be discussed in greater detail below. In addition, the components housed within the can 12, such as the sensor housing 20, may also be formed from these same engineering resins.

The keeper 16 is positioned at one end 17 of the can 12 and, as is conventional, may be temporarily held in place with a drop of adhesive (not shown). As a magnetic flux director, the keeper 16 may be formed from a suitable ferromagnetic material of a type known in the art. The circuit board 22 is electrically connected to circuitry within the sensor housing 20, as well as wires (not shown) to an external connector 26 mounted to the can 12. The sensor housing 20 contains an electromechanical sensing element (not shown) of a type known in the art which, in cooperation with the magnet 18, is able to sense acceleration along a predetermined axis of the can 12.

As shown in FIG. 2, the remaining space within the can 12 is filled with an adhesive potting material 28 of this invention, such that the potting material 28 surrounds and supports the keeper 16, magnet 18, sensor housing 20 and circuit board 22. The potting material 28 is a polybutadiene urethane, and more specifically, is composed of about 85 to about 100 parts by weight of a polyol of which at least about 70 weight percent is polybutadiene polyol, a flexibilized polyol/polyepoxide epoxy novolac in an amount up to about 15 weight percent, and a multifunctional isocyanate in an amount sufficient to achieve a stoichiometrically correct ratio. More specifically, such a ratio would result in typically one hydroxyl (OH) group for every 1.15±0.3 isocyanate group. Most preferably, the resulting blend is isocyanate-rich, such as on the order of up to about 20 parts by weight isocyanate, so as to ensure that the desired properties of the potting material 28 are achieved. Additional adjuncts, such as an antioxidant, defoaming agent, moisture collector, colorants, etc., may also be included as constituents of the potting material 28.

More specifically, the polyol noted above is generally a two component polyol blend of at least 70 weight percent polybutadiene polyol and one or more of the following polyols containing double bonds and/or oxygen in the polymer backbone: polyether polyols (preferably 10 weight percent polyoxypropylene polyol) having a fairly short chain for good thermal stability; hydroxyl polyurethane prepolymers; and a refined low moisture vegetable oil, such as castor oil. A suitable polybutadiene polyol is available as R45HT from Atochem, while the polyether polyol is preferably a polyether diol or triol having a molecular weight of about 200 to about 1500, with 2 to 10 carbon atoms between oxygen atoms in the polymer backbone. A preferred polyether polyol is a polyether polyoxypropylene triol with a molecular weight of about 530, and is available as PLURACOL TP440 from BASF.

The isocyanate component may be modified MDI isocyanate, a crude polymeric MDI-based isocyanate, other polymeric isocyanates, NCO terminated prepolymers, and aliphatic isocyanates. Diphenylmethane diisocyanate is preferred, which includes the 2,4', the 4,4' and the 2,2' isomers, as well as the higher functional polyisocyanate and polymethylene polyphenyl mixtures which may contain from about 20 to about 85 weight percent of diphenylmethane diisocyanate isomers. A suitable isocyanate component is available as ISONATE 143L from Dow Chemical. An NCO functionality of about 2.0 to about 2.4 is preferred for the isocyanate, but a range of about 2.0 to about 2.7 may be suitable.

The flexibilized polyol/polyepoxide epoxy novolac is preferably an epoxy novolac containing at least one hydroxyl group, at least one epoxide group, and a flexibilizing side-chain appendage to the aromatic ring consisting of fifteen carbon atoms. A suitable flexibilized polyol/polyepoxide epoxy novolac for practicing this invention is available from Cardolite under the trademark CARDOLITE NC-547, which is a polyglycidyl ether of an alkenyl phenol formaldehyde novolac resin, and has a fifteen carbon atom side chain. This particular epoxy novolac has the property of staying in solution in the polybutadiene system at any mix ratio, rather than crystallizing out. Furthermore, this flexibilized polyol/polyepoxide epoxy novolac is characterized by a very low glass transition temperature as compared to other novolac epoxies, which typically have glass transition temperatures of 100° C. or more. The flexibilized polyol/polyepoxide epoxy novolac serves to improve the adhesion of the potting material 28 to the surfaces of the can 12, and can be present in the potting material 28 within a range of up to about 15 weight percent. The side-chains act to repel water, and also make the epoxy novolac soluble in the polybutadiene polyol, while the hydroxyl groups of the epoxy backbone react with the isocyanate to form urethane makers. The flexibilized polyol/polyepoxide epoxy novolac also advantageously serves to increase the hardness of the potting material 28.

In accordance with this invention, as the level of the flexibilized polyol/polyepoxide epoxy novolac within the potting material 28 increases, so does the ability for the potting material 28 to adhere to the can 12 and the components housed within the can 12. In particular, the adhesion characteristics of the potting material 28 are improved to the extent that it will reliably adhere to engineering resins such as polybutylene terephthalate or polyethylene terephthalate, as well as materials such as E-coated steels. The resulting interfacial bond between the potting material 28 and the can 12 prevents the ingress of water and other contaminants into the assembly 10, even when the sensor assembly 10 is subjected to severe thermal cycling. Additions of a defoaming agent are preferable to further enhance the adhesion characteristics of the potting material 28. A suitable defoaming agent is an acrylic copolymer in a kerosene base, available as PC-1244 from Monsanto, which may be present in amounts of up to about one weight percent.

In a preferred embodiment, the potting material 28 further includes an antioxidant, which is preferably a high molecular weight sterically hindered phenolic that may be multifunctional, such as octadecyl 3,5-di-tert-butyl-4-hydroxyhydrocinnamate, available as IRGANOX 1076 from Ciba-Geigy, or tetrakis[methylene(3,5-di-tert-butyl-4-hydroxyhydrocinnamate)]methane, available as IRGANOX 1010 from Ciba-Geigy. The inclusion of an antioxidant is important in that double carbon bonds in the backbone structure of the polybutadiene polyol will harden and embrittle (cross-link) in the presence of oxygen. The antioxidant greatly enhances the resistance to degradation by this system when present in amounts of about one percent, with additions of up to about three weight percent being preferred. Higher levels of the antioxidant are undesirable from a cost standpoint.

The potting material 28 of this invention is characterized by the following approximate physical and mechanical properties, measured at about 25° C. where appropriate.

TABLE I

|  | MAXIMUM | PREFERRED |
| --- | --- | --- |
| Glass Transition Temp. (°C.) | −10 max | −40 max |
| Elongation (percent) | 50 to 300 | 90 to 200 |
| Tensile Strength (psi) | 75 to 900 | 120 to 700 |
| Hardness (Shore A) | 15 to 90 | 25 to 65 |
| Tear Resistance (lb/in) | 15 to 120 | 35 to 100 |
| Coef. of Thermal Exp. (PPM/°C.) | 90 to 340 | 180 to 280 |
| Mixed Viscosity (cps) | 200 to 30k | 200 to 15k |
| Shrinkage during cure (%) | 0 to 5 | 0 to 1 |

The above physical and mechanical properties are in accordance with the teachings of U.S. Pat. No. 5,185,498 to Sanftleben et al. The minimum values for elongation, tear resistance, tensile strength and CTE are required to prevent cracking and tearing of the potting material 28 during thermal cycling. The coefficient of thermal expansion (CTE) should be as low as possible within the stated range while remaining consistent with other properties. At lower CTEs within the maximum range, the mechanical and physical properties may tend toward the minimum values in Table I, while a CTE within the preferred range generally results in mechanical and physical properties closer to the preferred ranges. Materials with durometers less than 15 Shore A will tend to climb out of the can 12 during processing, and do not provide sufficient support for the sensor housing 20, resulting in mechanical damage from thermal cycling and thrusting. At the other extreme, materials with durometer readings higher than 90 Shore A may tend to damage the sensing element and printed circuit board 22 during thermal cycling.

During thermal cycling, stresses develop within the potting material 28 due to CTE mismatches between the different materials in the assembly. However, polybutadiene urethanes have a very low glass transition temperature (Tg) compared with other known potting compounds, and are in an elastomeric state across the entire thermal cycling range for the automotive environment of an acceleration sensor. As a result, the potting material 28 remains elastomeric in use, and therefore has appreciable free volume, enabling the potting material 28 to deform internally to alleviate stresses in three dimensions.

Initially during processing, the potting material 28 is in a liquid state, allowing it to be poured into the can 12 containing the magnet 18, sensor housing 20 and circuit board 22. The potting material 28 then cures quickly at a relatively low temperature, typically at room temperature up to about 150° C., depending on the amount of catalyst employed. The catalyst may be a metal catalyst, a metal salt, or an organometallic complex such as dibutyltin dilaurate. The resulting potting material 28 is a rubbery elastomeric material which unexpectedly has a transfer function of one for acceleration, such that when utilized as shown in FIG. 2, the potting material 28 bonds to the surfaces of the can 12 and its internal components, and faithfully transmits acceleration from the can 12 (and thus the automobile in which the can 12 is used) to the sensing element. Such a result is unexpected in that only rigid materials typically exhibit such a transfer function.

An additional advantage of this invention is that vastly improved processing results, demonstrated by significantly lower rejection rates, as compared to potted acceleration sensor assemblies formed by potting on sand methods. Furthermore, the potting material 28 adheres tightly to the surfaces of the can 12 and its internal components, and alleviates the requirement to use a conformal coating to protect the circuit board 22.

Examples of four potting material formulations in accordance with the above guidelines are provided in Table II below, wherein the amounts given are in parts by weight (pbw).

TABLE II

|  | #1 | #2 | #3 | #4 |
| --- | --- | --- | --- | --- |
| Polyol Blend | 100 | 95 | 90 | 85 |
| Epoxy Novolac | 0 | 5 | 10 | 15 |
| Isocyanate | 20.1 | 19.9 | 19.7 | 19.5 |
| Antioxidant | 1 | 1 | 1 | 1 |
| Defoaming Agent | 0.1 | 0.1 | 0.1 | 0.1 |

Note: The polyol blend is composed of: about 90 pbw polybutadiene polyol, and about 10 pbw polyoxypropylene polyol.

For the purpose of evaluating adhesion characteristics, five samples of each of the above compositions were prepared and lap shear tested in accordance with ASTM D1002, using a 30% glass-filled polybutylene terephthalate substrate material available as Celanex 3300 ED from Hoechst Celanese. The tests utilized a 40 mil (0.1 millimeter) bond line and a cross head speed of about 0.1 inch per minute (about 2.5 millimeters per minute). The results were as follows.

TABLE III

|  | #1 | #2 | #3 | #4 |
| --- | --- | --- | --- | --- |
| Epoxy Novolac (pbw) | 0 | 5 | 10 | 15 |
| Average Initial Lap Shear (psi) | 155.6 | 272.2 | 297.8 | 299.2 |

The above results indicated that adhesion between the potting material 28 and a can 12 formed from an engineering resin such as polybutylene terephthalate significantly increases with additions of the flexibilized polyol/polyepoxide epoxy novolac to the polybutadiene urethane blend. The confidence level of the data was in excess of 99%. From this data, it is believed that improvements in adhesion can be achieved with the use of the preferred flexibilized polyol/polyepoxide epoxy novolac at levels of up to 20% or more.

Five samples of each of the above compositions were then prepared and tested with an E-coated steel substrate, and lap shear tests were again performed in accordance with ASTM D1002. The results were as follows.

TABLE IV

|  | #1 | #2 | #3 | #4 |
| --- | --- | --- | --- | --- |
| Epoxy Novolac (pbw) | 0 | 5 | 10 | 15 |
| Average Initial Lap Shear (psi) | 272.2 | 263.6 | 293.6 | 333.8 |

Again, the above data suggests that improved adhesion is achieved by using higher amounts of the flexibilized polyol/polyepoxide epoxy novolac in the potting material 28, with a confidence level in excess of 99%.

The effect of humid aging on adhesion was then evaluated with five samples of each composition, using the same polybutylene terephthalate substrate noted above. The samples were aged for 2 weeks at 85° C./95% RH (±5%), and lap shear tests were performed in accordance with ASTM D1002. The results were as follows.

TABLE V

|  | #1 | #2 | #3 | #4 |
| --- | --- | --- | --- | --- |
| Epoxy Novolac (pbw) | 0 | 5 | 10 | 15 |
| Average Initial Lap Shear (psi) | 196.0 | 206.2 | 230.0 | 278.2 |

The above data indicated a significant improvement in adhesion with additions of the flexibilized polyol/polyepoxide epoxy novolac, with a confidence level in excess of 99%.

Durometer tests were then conducted in accordance with ASTM D2240 over a 28 day period for samples of each of the above compositions, with the following results (values in Shore A).

TABLE VI

| Days | #1 | #2 | #3 | #4 |
| --- | --- | --- | --- | --- |
| 0 | 55 | 59 | 65 | 65 |
| 3 | 58 | 67 | 70 | 71 |
| 5 | 61 | 71 | 73 | 74 |
| 7 | 64 | 73 | 75 | 75 |
| 14 | 71 | 72 | 74 | 75 |
| 21 | 74 | 74 | 74 | 74 |
| 28 | 74 | 73 | 74 | 74 |

Durometer tests were also conducted in accordance with ASTM D2240 after standard aging tests conducted at ambient, 125° C. dry, and 85° C./95% RH, for samples of each of the above compositions, with the following results (values in Shore A).

TABLE VII

| Conditions | #1 | #2 | #3 | #4 |
|---|---|---|---|---|
| Ambient | 74 | 73 | 74 | 74 |
| 125° C. | 91 | 93 | 94 | 95 |
| 85° C./95% RH | 75 | 75 | 77 | 79 |

The electrical performance of the above samples after testing was excellent, with a volume resistivity of greater than about $1 \times 10^{14}$ ohm-cm being exhibited as tested per ASTM D257, regardless of the aging condition.

Finally, it is believed that the potting material 28 of this invention exhibits a preferred combination of physical and mechanical properties when formulated in accordance with the following.

TABLE VIII

|  | pbw |
|---|---|
| Polyol Blend of: | |
| polybutadiene polyol | 79.05 |
| polyether polyoxypropylene triol | 10.00 |
| Epoxy Novolac | 7.50 |
| Diphenylmethane diisocyanate | 20.00 |
| Antioxidant (e.g., IRGANOX 1010 or 1076) | 1.00 |
| Defoaming Agent (e.g., PC-1244) | 0.05 |

In addition to the above, numerous additives can be included in the above compound, including: a metallic catalyst, such as dibutyltin dilaurate, in amounts of up to about 0.5 weight percent; a moisture collector, such as Lindy sieve 4A, in amounts of up to about 2 weight percent; pigments, such as non-conducting carbon black and/or iron oxide, in amounts of up to about 3 weight percent; plasticizers or extenders such as a phthalate ester (e.g., di-(2-ethyl-hexyl) phthalate or a mineral oil) in amounts of up to about 30 weight percent; fillers such as ceramic or glass beads, silica, talc, hollow microspheres, or alumina having a maximum size of about 60 micrometers; surface-modified rubber particles, urea formaldehyde powders, microspheres and ceramic spheres as fillers or extenders; a short chain, very reactive diamine, or a short chain, very reactive polyol, or N,N bis(2-hydroxypropyl) aniline in amounts sufficient to enhance green strength; and adhesion promoters, such as amino functional silanes, including gamma-aminopropyltriethoxysilane, in amounts of up to about 2 weight percent. For use as a potting material for the acceleration sensor assembly 10, the suggested fillers may be used in amounts sufficient to obtain a 30,000 cps maximum viscosity. However, those skilled in the art will recognize that, if the material is to be used primarily as an adhesive compound, lesser or greater amounts of filler can be added in order to obtain a significantly higher or lower viscosity than 30,000 cps.

In accordance with the above, an advantageous feature of the potting material of this invention is that the potting material is highly suited for potting an acceleration sensing element for use in an automotive environment. The potting material is formulated to include the polybutadiene urethane base composition taught by U.S. Pat. No. 5,185,498 to Sanftleben et al., whose physical and mechanical properties result in a potting material which is readily able to withstand the hostile environment of an automobile engine compartment. Furthermore, the potting material of this invention can also be processed in a manner which overcomes the shortcomings of prior art potting urethanes whose processing requires the use of pot-on-sand processing techniques.

In addition, a particularly advantageous feature of the potting material of this invention is enhanced adhesion properties due to additions of a flexibilized polyol/polyepoxide epoxy novolac. As a result, the potting material is able to more reliably adhere to the surfaces of a can formed from an engineering resin, such as polybutylene terephthalate or polyethylene terephthalate, as well as a can formed from such materials as E-coated steels. As such, the potting material is also suitable for use as an adhesive, coating, or an encapsulating material for a wide variety of applications in the electronics industry, as well as others.

While our invention has been described in terms of a preferred embodiment, it is apparent that other forms could be adopted by one skilled in the art—for example, by utilizing additional processing methods, or by substituting appropriate materials for those suggested, or by utilizing the teachings of this invention in applications and environments other than those described. Accordingly, the scope of our invention is to be limited only by the following claims.

The embodiments of the invention in which an exclusive property or privilege is claimed are defined as follows:

1. A polymeric material comprising:

about 85 to about 100 parts by weight of a polyol, said polyol comprising at least about 70 weight percent polybutadiene polyol;

a flexibilized polyol/polyepoxide epoxy novolac in an amount of greater than zero and up to about 15 parts by weight; and a multifunctional isocyanate in an amount sufficient to achieve a stoichiometrically correct ratio;

wherein said adhesive material has a hardness of about 15 to about 90 durometer Shore A.

2. A polymeric material as recited in claim 1 wherein said polyol consists essentially of about 90 weight percent of polybutadiene polyol, with the remainder being essentially polyoxypropylene polyol.

3. A polymeric material as recited in claim 1 wherein said multifunctional isocyanate is diphenylmethane diisocyanate.

4. A polymeric material as recited in claim one wherein said flexibilized polyol/polyepoxide epoxy novolac contains at least one hydroxyl group, at least one epoxide group, and a flexibilizing side-chain appendage to the aromatic ring consisting of a fifteen carbon atom side-chain.

5. A polymeric material as recited in claim 1 wherein said polyol and said multifunctional isocyanate form a urethane system, and wherein said flexibilized polyol/polyepoxide epoxy novolac is soluble in said urethane system so as to enhance the adhesion properties of said urethane system.

6. A polymeric material as recited in claim 1 further comprising at least one adjunct selected from the group consisting of an antioxidant and a defoaming agent.

7. A polymeric material as recited in claim 1 wherein said polymeric material is characterized by a glass transition temperature of below about −10° C., and mechanical properties at about 25° C. of about 15 to about 90 Shore A durometer, about 50 to about 300 percent elongation, and about 75 to about 900 psi tensile strength.

8. A polymeric material as recited in claim 1 further comprising at least one adjunct selected from the group consisting of a metallic catalyst, pigmentation, a filler material, a plasticizer, an extender, and an adhesion promoter.

9. An adhesive potting material for potting a sensing element within a container, said potting material comprising:

about 85 to about 100 parts by weight of a polyol, said polyol comprising at least about 70 weight percent polybutadiene polyol;

a flexibilized polyol/polyepoxide epoxy novolac in an amount up to about 15 parts by weight; and a multifunctional isocyanate in an amount of up to about 20 parts by weight, so as to achieve a stoichiometrically correct ratio;

wherein said potting material is characterized by a glass transition temperature of below about −10° C., and mechanical properties at about 25° C. of about 15 to about 90 Shore A durometer, about 50 to about 300 percent elongation, and about 75 to about 900 psi tensile strength, and wherein said potting material maintains its integrity under thermal cycling conditions so as to exclude foreign elements from said sensing element when potted within said container with said potting material.

10. A potting material as recited in claim 9 wherein said polyol comprises about 90 weight percent polybutadiene polyol.

11. A potting material as recited in claim 9 further comprising an antioxidant in an amount of up to about 3 weight percent and a defoaming agent in an amount of up to about 1 weight percent.

12. A potting material as recited in claim 9 wherein said multifunctional isocyanate is selected from the group consisting of polymeric isocyanates, NCO terminated prepolymers, and aliphatic isocyanates.

13. A potting material as recited in claim 9 wherein said flexibilized polyol/polyepoxide epoxy novolac contains at least one hydroxyl group, at least one epoxide group, and a flexibilizing side-chain appendage to the aromatic ring consisting of a fifteen carbon atom side-chain.

14. A potting material as recited in claim 9 wherein said multifunctional isocyanate has a NCO functionality of about 2.0 to about 2.7.

15. A potting material as recited in claim 9 wherein said potting material further comprises at least one additive selected from the group consisting of a metallic catalyst, a moisture collector, pigment, a plasticizer or extender, a filler material, a green strength enhancer, and an adhesion promoter.

16. A polybutadiene urethane potting material for potting a sensing element within a container, said potting material comprising:

about 85 to about 100 parts by weight polybutadiene polyol, said polybutadiene polyol comprising about 10 parts by weight of a polyether diol or triol, and about 90 parts by weight polybutadiene polyol;

greater than zero and up to about 20 parts by weight flexibilized polyol/polyepoxide epoxy novolac;

greater than zero and up to about 20 parts by weight diphenylmethane diisocyanate;

a sterically hindered phenolic in an amount of greater than zero and up to about 3 weight percent;

a defoaming agent consisting essentially of an acrylic copolymer in a kerosene base in an amount of greater than zero and up to about 1 weight percent; and additions of a moisture collector and colorant;

wherein said potting material is characterized by a glass transition temperature of below about −40° C., and mechanical properties at about 25° C. of about 25 to about 65 Shore A durometer, about 90 to about 200 percent elongation, and about 120 to about 700 psi tensile strength, and wherein said potting material maintains its integrity under thermal cycling conditions so as to exclude foreign elements from said sensing element when potted within said container with said potting material.

17. A polybutadiene urethane potting material as recited in claim 16 wherein:

said polybutadiene polyol is present in an amount of about 79.05 parts by weight;

said polyether is present in an amount of about 10 parts by weight;

said flexibilized polyol/polyepoxide epoxy novolac contains at least one hydroxyl group, at least one epoxide group, and a flexibilizing side-chain appendage to the aromatic ring consisting of a fifteen carbon atom side-chain, said flexibilized polyol/polyepoxide epoxy novolac being present in an amount of about 7.5 parts by weight;

said diphenylmethane diisocyanate is present in an amount of about 20 parts by weight;

said sterically hindered phenolic is present in an amount of about 1 part by weight; and said defoaming agent is present in an amount of about 0.05 part by weight.

18. A polybutadiene urethane potting material as recited in claim 16 wherein said polyether is polyether polyoxypropylene triol.

19. A polybutadiene urethane potting material as recited in claim 16 wherein said diphenylmethane diisocyanate has a NCO functionality of about 2.0 to about 2.4.

20. A polybutadiene urethane potting material as recited in claim 16 wherein said potting material further comprises at least one filler material selected from the group consisting of surface-modified rubber particles, urea formaldehyde powders, microspheres and ceramic spheres.

* * * * *